United States Patent [19]
Tanaka et al.

[11] Patent Number: 5,351,621
[45] Date of Patent: Oct. 4, 1994

[54] TRAVELING INSPECTION ROBOT SYSTEM

[75] Inventors: Keiji Tanaka; Tatsuyuki Omote; Yutaka Kometani; Masaki Takahashi, all of Hitachi; Tsuyoshi Kido, Ibaraki; Tetsuo Waki, Hitachi; Tomiharu Yoshida, Katsuta, all of Japan

[73] Assignee: Hitachi, Ltd., Tokyo, Japan

[21] Appl. No.: 18,544

[22] Filed: Feb. 17, 1993

[30] Foreign Application Priority Data

Feb. 17, 1992 [JP] Japan .................................. 4-029773

[51] Int. Cl.$^5$ .............................................. B61B 3/00
[52] U.S. Cl. ...................................... 104/94; 105/154
[58] Field of Search ................... 104/89, 93, 94, 118, 104/119, 121, 139, 108; 105/148, 154, 133

[56] References Cited

U.S. PATENT DOCUMENTS

| 3,580,183 | 5/1971 | Nearman | 104/108 |
| 4,243,147 | 1/1981 | Twitchell et al. | 104/89 |
| 4,718,349 | 1/1988 | Wahren | 104/165 |

FOREIGN PATENT DOCUMENTS

| 1418385 | 10/1965 | France | 104/89 |
| 213562 | 10/1985 | Japan . | |
| 230094 | 11/1985 | Japan . | |
| 0786193 | 11/1957 | United Kingdom | 104/89 |

*Primary Examiner*—Mark T. Le
*Attorney, Agent, or Firm*—Antonelli, Terry, Stout & Kraus

[57] ABSTRACT

In a traveling inspection robot system, two carriages are each provided with one pair of guide rollers for guiding the travel in the vertical direction and two pairs of side rollers for guiding the travel in the horizontal direction. The two pairs of side rollers are arranged such that one pair locates on each of the front and rear sides of the pair of guide rollers as viewed in the direction of advance. The two carriages are interconnected by a coupling plate through parallel steering shafts, and a sprocket and a motor for driving the sprocket are provided as travel driving device on one carriage for giving a traction force to a transversely central portion of the upper inner surface of the monorail. An antenna and a current collector are provided on the other carriage. A control circuit unit and a span and tilt mechanism are attached to the coupling plate with a sensor unit mounted to the span and tilt mechanism. A swing motor and a tilt motor in the span and tilt mechanism are arranged in respective dead spaces created when the span and tilt mechanism swings and tilts. A chain, a trolley line and an antenna line are laid and wired on the upper inner surface of the monorail. With such an arrangement, the degree of freedom in rail design can be increased, the robot and the monorail can be both made small in size, and therefore the applicable range of the traveling inspection robot can be enlarged.

22 Claims, 8 Drawing Sheets

TRAVELING INSPECTION ROBOT SYSTEM

BACKGROUND OF THE INVENTION

The present invention relates to a traveling inspection robot system, and mole particularly to a traveling inspection robot system which runs under remote operation or automatic operation via a control console installed on the ground and is suitable for use in inspection and monitoring of nuclear power plants.

As described in JP, A, 60-230094 entitled "Apparatus for Monitoring Nuclear Power Plant", there is conventionally known an idea of the so-called traveling inspection robot arranged such that a monorail is installed along an inspection route, a carriage is propelled to travel following the monorail, and further a sensor unit including a combined set of various sensors is mounted on the carriage through a pan and tilt mechanism, thereby carrying out inspection and monitoring.

Also, in the above-cited JP, A, 60-230094, a travel unit for the traveling inspection robot is constructed by mounting upper front and rear travel wheels and lower front and rear travel wheels on a traveling carriage in such a manner that the monorail is sandwiched between these upper and lower travel wheels on the front and rear sides.

Meanwhile, another similar travel unit for use in other than the traveling inspection robot is described in JP, A, 50-213562 entitled "Baggage Carrying Equipment". A travel unit for the described equipment is arranged such that two carriages are each provided with a pair of guide rollers for guiding the travel in a direction vertical to a monorail and two pairs of side rollers for guiding the travel in a direction transverse to the monorail, and these two carriages are connected with a coupling member through parallel steering shafts to be rotatable independently of each griper, thereby avoiding interference with the monorail curved in the horizontal direction. The described travel unit also includes, as travel driving means for giving a travel driving force to the carriages, a motor, a transmission mechanism and a friction driving wheel. Which are located above the guide rollers and the side rollers. On the inner side of the monorail, there are formed a guide surface over which the side rollers roll, and a friction surface which locates above the guide surface and over which the friction driving wheel rolls. The monorail has a height enough to form both the guide surface and the friction surface, as well as to accommodate the travel driving motor and the transmission mechanism.

Further, U.S. Pat. No. 4,718,349 discloses a baggage carrying apparatus that a conveyor belt is installed along a guide track and a palette is placed on the guide rail to be carried by the conveyor belt. A U-shaped guide groove is formed at the center of the guide track, and the conveyor belt is traveled in the guide groove. Two segments having two pairs of side rollers to guide the travel are provided on a side wall of the guide groove and coupled with the palette through parallel steering shafts to be rotatable independently of each other.

SUMMARY OF THE INVENTION

The above-mentioned prior arts, however, have the following problems.

In the prior art described in JP, A, 60-230094, because the carriage is traveled with the monorail sandwiched between the upper and lower travel wheels, the travel unit cannot smoothly curve following the monorail when the monorail is curved in the vertical or horizontal direction. Also, the lower travel wheels are positioned outwardly of the monorail and, therefore, the travel unit is enlarged in size. Stated otherwise, no consideration, as are paid to points of reducing the radius of curvature of the monorail to increase the degree of freedom in rail design and reducing the cross-sectional area for passage of the robot to make the robot size smaller. Accordingly, this prior art has difficulties in mounting an inspection robot into a narrow space when it is practically applied to actual facilities such as nuclear power plants, and cannot increase the applicable range of the inspection robot.

In the prior art described in JP, A, 50-213562, because the two carriages are each provided with a pair of the guide rollers and two pairs of the side rollers, and these two carriages are connected with the coupling member through the parallel steering shafts, the travel unit can smoothly travel while avoiding interference with the monorail curved in the horizontal direction. However, since the travel driving means for giving the travel driving force to the carriages is constructed by arranging the friction driving wheel above the guide rollers and the side rollers, and by pressing the friction driving wheel against the friction surface on the inner side of the monorail, the travel unit and the monorail are both enlarged in size. Accordingly, when this prior art is applied to a traveling inspection robot, not only the size of a robot body cannot be made small, but also the monorail size becomes large. In other words, this prior art also has difficulties in mounting the inspection robot into a narrow space and cannot increase the applicable range of the inspection robot.

The travel unit disclosed in U.S. Pat. No. 4,718,349 is arranged to give a driving force to the carriage by externally pulling the conveyor belt and, hence, cannot be applied to a self-propelled traveling inspection robot of the type that travel driving means is built in the travel unit itself.

An object of the present invention is to provide a traveling inspection robot system and a traveling inspection robot for use in the system, with which the degree of freedom in rail design is increased, both the inspection robot and a monorail have small size, and the applicable range of the inspection robot can be more wide.

To achieve the above object, in accordance with the present invention, there is provided a traveling inspection robot system comprising a monorail and an inspection robot traveling along said monorail, said inspection robot comprising a travel unit and a sensor unit mounted to said travel unit, said system being operated by a control console installed on the ground, wherein (a) said monorail is a channel-shaped rail comprising a closed upper wall, a pair of side walls suspending from both transverse ends of said upper wall in opposite relation to form first travel guide surfaces, and a pair of lower walls extending inwardly from lower ends of said side walls to form second travel guide surfaces and spaced from each other in the transverse direction by a groove; and (b) said travel unit comprises first and second carriages, each being provided with one pair of guide rollers contacting said second travel guide surfaces inside said monorail to guide the travel in the vertical direction and with two pairs of side rollers arranged on the front and rear sides of said pair of guide rollers as viewed in the direction of advance, respectively, and contacting said first travel guide surfaces inside said monorail to guide the travel in the horizontal direction, coupling means interconnecting said first and second carriages for independent rotation thereof through parallel steering shafts attached to said first and second carriages, respectively, and travel driving means provided on at least one of said first and second carriages for giving a traction force to a transversely central portion of said upper wall inside said monorail.

With the present invention thus arranged, the guide rollers, the side rollers and the travel driving means are all accommodated inside tile channel-shaped monorail. Accordingly, the provision of those travel components does not need more space than defined by width x height of the rail cross-section that is essentially required for the monorail itself, and gives rise to no additional increase in the cross-sectional area for passage of the robot. Thus, the size of the inspection robot can be reduced.

The travel driving means is constructed to give the traction force to the transversely central portion of the rail upper wall inside tile monorail and, therefore, the rail side walls are not required to have an additionally increased height for installation of the travel driving means, with able result of that the rail size can also be reduced. For example, it is sufficient for the rail side wall to have an external height almost equal to the sum of the diameter of the guide rollers, the thickness of the rail upper wall, and the thickness of the rail lower walls.

Further, the two pairs of side rollers are arranged on the front and rear sides of the guide rollers as viewed in the direction of advance, respectively, and the two carriages are interconnected through parallel steering shafts. Therefore, even for the monorail which is curved vertically or turned horizontally, the carriages can travel smoothly with no possibility that the attachments other than the guide rollers may contact the monorail. Also, since the travel driving means is mounted at the middle position between the two pairs of the side rollers, the travel unit can be always driven to stably travel along the center of the monorail even in a horizontally curved region of the monorail. Additionally, because of using the channel-shaped monorail which has the groove between both the lower walls, the robot is of the suspension type that the carriages and the sensor unit are suspended through that groove, and the robot can be traveled in a stable manner. As a result, it is possible to reduce the radius of curvature of the monorail and increase the degree of freedom in rail design.

Thus, with a reduction in size of the inspection robot and the monorail and the greater degree of freedom in rail design, the robot system can be easily mounted into a narrow space when it is practically applied to actual facilities such as nuclear power plants, and the applicable range of the robot system can be enlarged.

In the above robot system, preferably, said travel driving means comprises a travel sprocket arranged in a transversely central portion of one of said first and second carriages at a middle position between said two pairs of side rollers, and a chain arranged in the transversely central portion of said upper wall and held in mesh with said travel sprocket inside said monorail. By so using the sprocket as the travel driving means and laying the chain on the upper inner surface of the monorail, positive driving can be easily provided just by applying torque to the sprocket without causing a slip or the like. Since the chain laid on the upper inner surface of the monorail is accommodated within the intrinsic cross-sectional area of the monorail, such an arrangement will not impede a reduction in size of the inspection robot.

Preferably, said travel unit further comprises a motor mounted on the same carriage as said sprocket for driving said sprocket. By mounting the too Lot for driving the sprocket on the same carriage as the sprocket, the whole or a part of tile motor can be arranged to locate inside the monorail. This also contributes to a reduction in size of the inspection robot, Preferably, said travel unit further comprises a current collecting device, an antenna for wireless communication and/or other control units all mounted on the other of said first and second carriages inside said monorail. By so mounting the current collecting device, the antenna for the wireless communication device or other control units on the other carriage than tile carriage provided with the travel driving means, the space inside the monorail can be effectively utilized and the number of those components which must be mounted below the coupling means is reduced. This further contributes to a reduction in the robot size.

Preferably, said travel unit further comprises a trolley line wired along one side of said upper wall in the transverse direction inside said monorail and an antenna line for wireless communication wired along the other side thereof, said current collecting device and said antenna for wireless communication being arranged at a middle position between said two pairs of side rollers of the other said carriage in opposite relation to said trolley line and said antenna line, respectively. By so arranging the trolley line and the antenna line for wireless communication wired, as well as the current collecting device and the antenna for the wireless communication device, the current collecting device and the antenna for the communication device are arranged intermediate the two pairs of side rollers, with the result of that the current collecting device and the antenna are always positioned just below the trolley line and the antenna line, respectively, even in a horizontally curved region of the monorail. Accordingly, stable power feeding and stable communication can be easily realized.

Preferably, said two pairs of side rollers are offset relatively in the vertical direction. Since the robot is positioned below the monorail, the curvature of the upwardly curving monorail can be set to be large, but the curvature of the downwardly curving monorail cannot be set to be large for the necessity of avoiding interference with the robot. By making the two pairs of front and rear side rollers offset relatively in the vertical direction, the robot can be guided without causing interference with the monorail curving upwardly and downwardly with different curvatures.

Preferably, said traveling inspection robot system further comprises a gate-shaped pan and tilt mechanism attached to one of said first and second carriages to be swingable by a swing motor, and said sensor unit is attached to said gate-shaped pan and tilt mechanism to be tiltable by a tilt motor, said swing motor and said tilt motor being arranged in respect ire dead spaces created when said gate-shaped pan and tilt mechanism swings and tilts. By so mounting the swing motor and the tilt motor in the dead spaces respectively created when the gate-shaped pan and tilt mechanism swings and tilts, the space essentially required for the pan and tilt mechanism to swing and tilt is not enlarged by the provision of both the motors, making it possible to reduce the size of the pan and tilt mechanism, hence the robot size.

Preferably, said pan and tilt mechanism is arranged forwardly of the steering shaft of said one carriage as viewed in the direction of advance. By so arranging the span and tilt mechanism, there is created a wide space rearwardly of the span and tilt mechanism in which space the control circuit unit of the robot can be mounted. Also, since the cable leading through the swing shaft of the span and tilt mechanism can be introduced through the steering shaft to the control circuit unit on the rear side, many individual cables wired in the robot can be bundled together into a single cable without twisting it to a large extent and needing any additional space for the cable wiring. Such neat bundling of the individual cables eliminates the need of taking the larger cross-sectional area for passage of tile robot with a margin in consideration of a fear that any cable may be caught by something when the robot passes near it. This enables more compact size of the robot.

In the above robot system, preferably, said travel unit further comprises third and fourth carriages respectively attached to said first and second carriages through elastic support means. In this case, said third and fourth carriages each have a collision sensor and a collision damper attached, for example, to each of foremost and rearmost portions as viewed in the direction of advance. By so attaching the third and fourth carriages respectively to the first and second carriages through the elastic support means, the additional carriages are also accommodated within the cross-sectional dimension of the monorail and, therefore, the space necessary for installation of various units and control circuits can be increased without additionally enlarging the cross-sectional area for passage of the robot. Also, by providing the collision sensor and the collision damper on each of third and fourth carriages, when the span and tilt mechanism, the sensor unit, the control circuit unit and so forth mounted below the coupling means are about to strike against the end of the monorail or another robot, it is possible to detect such a collision before it happens, and damp shocks produced upon the collision. The provision of the collision sensor and the collision damper do not enlarge the robot size, thus providing the small-sized inspection robot.

The above robot system, preferably, further comprises holder means for holding said monorail to a stationary portion, said holder means comprising a holder body covering said monorail from the outside, at least three long bolts attached to an upper portion of said holder body, and a support for fixing said at least three long bolts in such a manner as able to absorb setting errors of said monorail in both the longitudinal and perpendicular directions of said monorail and thermal expansion of said monorail. By so constructing the holder means for the monorail, the error etc. in the longitudinal direction of the monorail can be absorbed by relative sliding between tile monorail and the holder body covering the monorail from the outside, the error etc. in the vertical direction perpendicular to the longitudinal direction of the monorail can be absorbed by adjusting the long bolts, and further the error etc. in the horizontal direction perpendicular to the longitudinal direction of the monorail can be absorbed by adjustment between the long bolts and the support. Thus, there can be easily obtained holder means which can absorb the errors, etc. in three orthogonal directions including the longitudinal direction of the monorail. Also, since the error in the longitudinal direction of the monorail is absorbed through both the monorail and the holder body, the number of degrees of freedom necessary for the absorbing mechanism can be reduced by one and the space required for installation of the monorail can be made smaller correspondingly. Using the three or more long bolts makes it possible to provide high rigidity in all directions and ensure sufficient resistance against earthquake to be met when installed in nuclear power plants or the like.

The above robot system, preferably, comprises a plurality of rail elements joined to each other to make up said monorail, and joint means for covering joined portions of adjacent rail elements from the outside, said joint means being fixed in place by tightly fastening bolts through the side walls of the adjacent rail elements such that inner surfaces of said rail elements become smooth. By arranging the joint means for the rail elements to cover the joined portions of tile rail elements from the outside, rigidity against bending in both the vertical and horizontal directions can be easily ensured by increasing the monorail just to such an extent as corresponding to the joint means. Also, by fastening the bolts for connection of the joint means through the side walls of the monorail, the travel guide surfaces of the lower walls contacting the guide rollers, which bear the dead load of the robot in the vertical direction, can be kept smooth without any irregularities. Further, by finishing the inner surfaces of the monorail to become smooth after assembly of the connecting bolts, travel resistance will not be increased for the side rollers as well.

Preferably, said travel unit further comprises a trolley line and an antenna line for wireless communication both being wired along said upper wall inside each of said rail elements, said trolley lines and/or said antennas for wireless communication in the adjacent rail elements being led out of said monorail through said joint means and connected to each other through connectors. By so leading the trolley lines and communication lines out of the monorail at the rail joint means and interconnecting them through the connectors, the need of wiring the trolley line and the communication line thoroughly each time the monorail is disassembled, for example, when the monorail installed in a narrow place within nuclear power plants or the like is a hindrance, and only the monorail corresponding to the required region can be easily attached and detached.

DETAILED DESCRIPTION OF THE PREFERRED EMBODIMENTS

Hereinafter, preferred embodiments of the present invention will be described with reference to the drawings.

Figure 1:
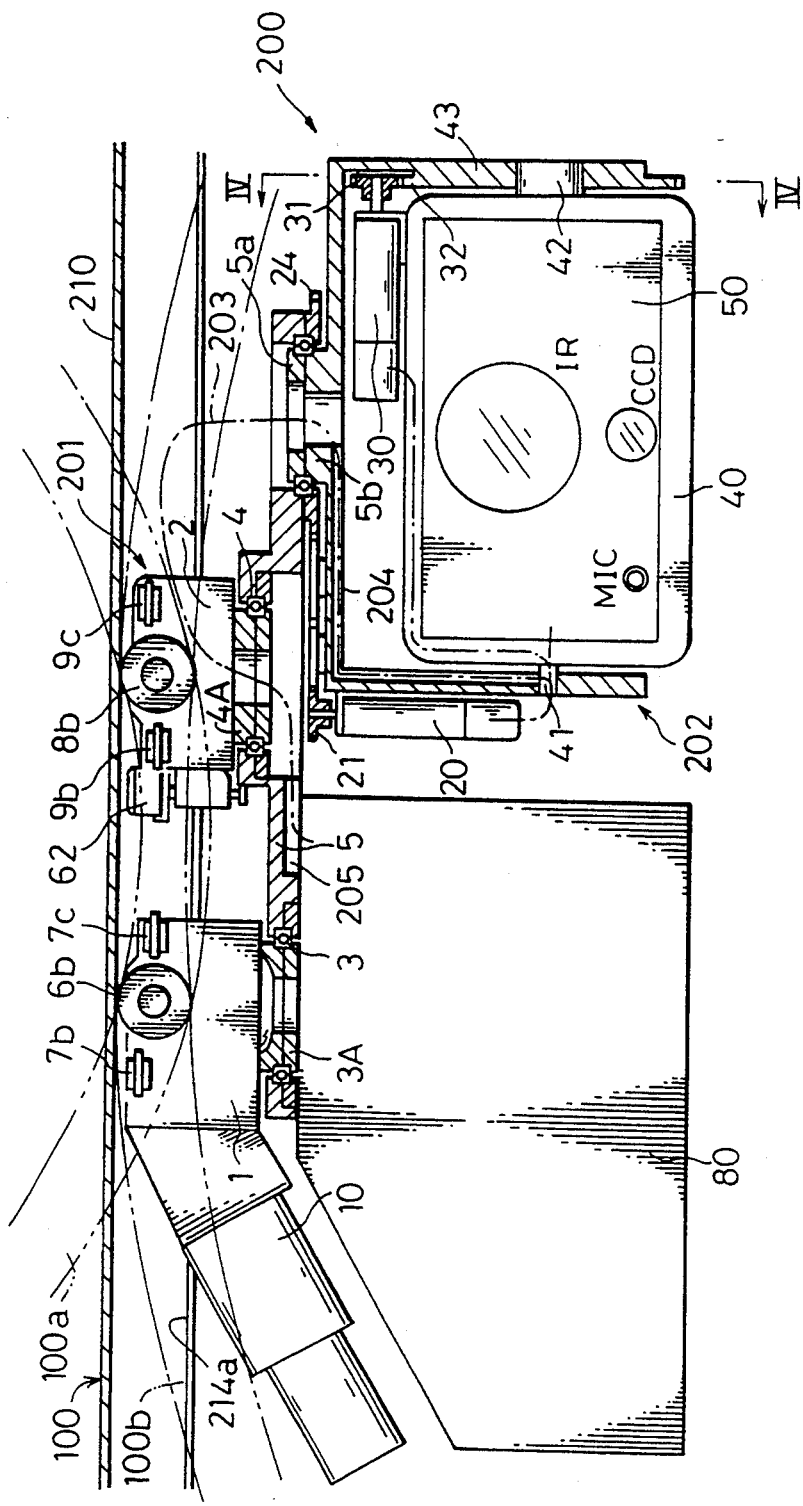
FIG. 1 is a side view, partly broken, of a traveling inspection robot system according to one embodiment of the present invention.
Figure 2:
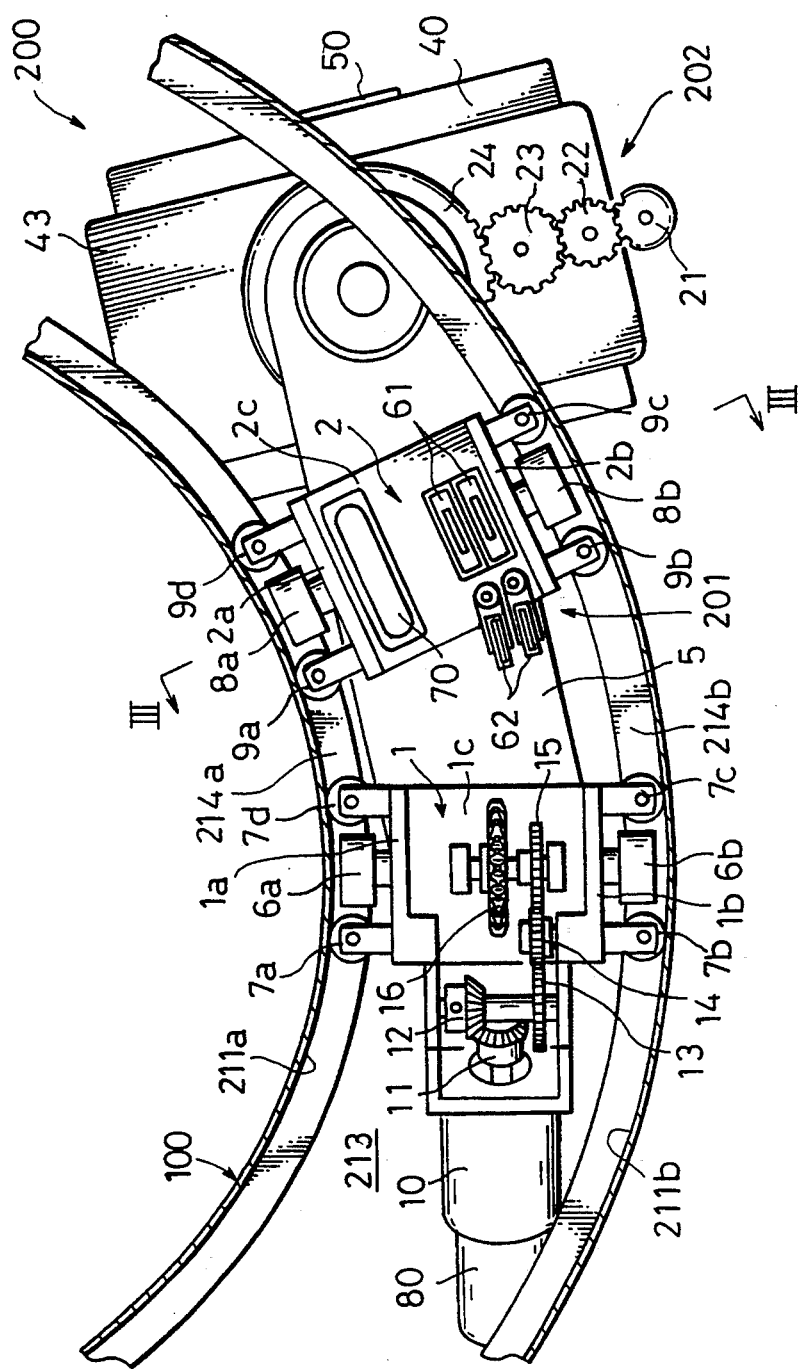
FIG. 2 is a top plan view, partly broken, of the robot system shown in FIG. 1.
Figure 3:
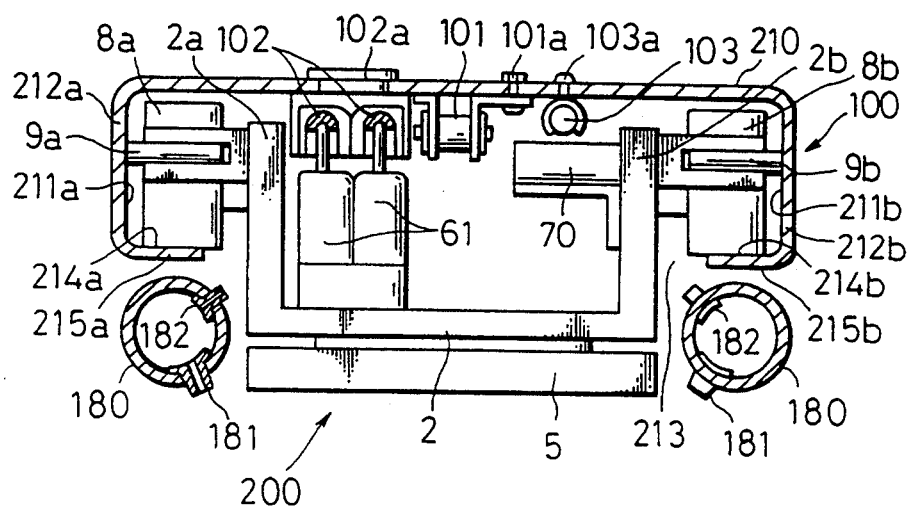
FIG. 3 is a cross-sectional view taken along line III—III in FIG. 2.

In FIGS. 1 to 3, a traveling inspection robot system of this embodiment comprises a monorail 100 and a suspended inspection robot 200 traveling along the monorail 100.

The monorail 100 is a channel-shaped rail and, as will be best seen from FIG. 3, it comprises a closed upper wall 210, a pair of side walls 212a, 212b suspending from both transverse ends of the upper wall 210 in opposite relation To respectively form first travel guide surfaces 211a, 211b, and a pair of lower walls 215a, 215b extending inwardly from lower ends of the side walls 212a, 212b to form second travel guide surfaces 214a, 214b, respectively, and spaced from each other in the transverse direction by a longitudinal lower groove 213.

The inspection robot 200 comprises a travel unit 201, a pan and tilt mechanism 202, and a control circuit unit 80, the last twos of which are mounted to and below the travel unit 201. A sensor unit 50 is mounted to the pan and tilt mechanism 202.

The travel unit 201 includes two carriages 1, 2 traveling in the longitudinal groove 213 of the monorail 100. The carriage 1 comprises, as shown in FIG. 2, side plates 1a, 1b opposite to each other and a base plate 1c, which jointly define a U-shaped cross-section. Likewise, the carriage 2 comprises side plates 2a, 2b and a base plate 2c, which jointly define a U-shaped cross-section.

The carriage 1 is provided on the side plates 1a, 1b with one pair of guide rollers 6a, 6b contacting the second travel guide surfaces 214a, 214b inside the monorail 100 guide the travel in the vertical direction, and with two pairs of side rollers 7a, 7b and 7c, 7d, one pair 7a, 7b of which is arranged on the front side of the guide rollers 6a, 6b as viewed in the direction of advance, and the other pair 7c, 7d of which is arranged on the rear side of the guide rollers, and which are contacting the first travel guide surfaces 211a, 211b inside the monorail 100 to guide the travel in the horizontal direction. The carriage 2 is similarly provided on the side plates 2a, 2b with one pair of guide rollers 8a, 8b and two pairs of side rollers 9a, 9b and 9c, 9d. The two pairs of side rollers for each carriage are arranged such that the rear pairs 7a, 7b and 9a, 9b are offset relative to the front pairs 7c, 7d and 9c, 9d in the vertical direction. In other words, the rear pair of side rollers 7a, 7b of the carriage 1 are positioned at a higher level than the front pair of side rollers 7c, 7d, and the front pair of side rollers 9c, 9d of the carriage 2 are positioned at a higher level than the rear pair of side rollers 9a, 9b.

The side walls 212a, 212b of the monorail 100 have an external height almost equal to the sum of the diameter of the guide rollers 6a, 6b and 8a, 8b, the thickness of the upper wall 210 of the monorail 100, and the thickness of the lower walls 215a, 215b of the monorail 100.

On the base plate 1c of the carriage 1, as shown in FIG. 2, there are mounted a sprocket 16 and a travel motor 10 for cooperatively applying a traction force to a transversely central portion of the upper wall 210 inside the monorail 100. A part of the travel motor 10 is extending outwardly of the carriage 1. Power from the travel motor 10 is transmitted to the sprocket 16 via gears 11, 12, 13, 14. The sprocket 16 is positioned at the middle between the two pairs of side rollers 7a, 7b and 7c, 7d and in the transversely central portion of the carriage 1.

On the base plate 2c and the side plate 2b of the carriage 2, there are mounted a pair of current collectors 61 constituting a current collecting device, and an antenna 70 of a wireless communication device. In this embodiment, another pair of current collectors 62 are also mounted on the carriage 2 for the purpose of ensuring reliability in contact power feeding. Note that, if necessary, any other control units may also be disposed on the carriage 2.

Further, as shown in FIG. 1, steering shafts 3A, 4A parallel to each other are attached to lower surfaces of the base plates 1c, 2c of the carriage 1 and the carriage 2, respectively. These steering shafts 3A, 4A are supported to a coupling plate 5 through bearings 3, 4 so that the carriages 1, 2 are interconnected to be rotatable independently of each other.

The span and tilt mechanism 202 is attached to a lower surface of the coupling plate 5 at a position forwardly of the steering shaft 4A of the carriage 2, while the control circuit unit 80 is attached to the lower surface of the coupling plate 5 at a position rearwardly of the steering shaft 4A of the carriage 2.

The span and tilt mechanism 202 has a gate-shaped swing frame 43 connected with a distal end of the coupling plate 5 through a swing shaft 5b which is guided by a bearing 5a, with tilt shafts 41, 42 rotatably attached to the swing frame 43. The tilt shafts 41, 42 are rotary shafts associated with a tilt frame 40 and, though not shown, may be supported by bearings. The sensor unit 50 is attached to the tilt frame 40 in an easily detachable manner. A swing motor 20 is attached to an outer lateral face of the swing frame 43, and a swing driving force is transmitted via gears 21, 22, 23 from the swing motor 20 to a gear 24 fixed to the coupling plate 5. The swing motor 20 is arranged at a position within the maximum radius of swing of the swing frame 43, i.e., in a dead space created when the swing frame 43 swings.

Figure 4:
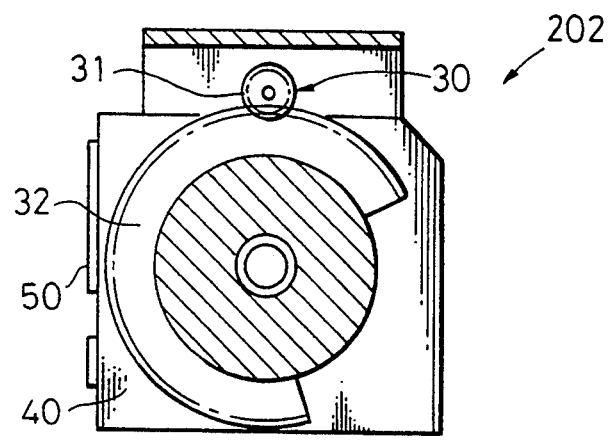
FIG. 4 is a cross-sectional view taken along line IV—IV in FIG. 1.

A tilt motor 30 is attached to an upper surface of the tilt frame 40 and, as shown in FIG. 4, a tilt driving force is transmitted via a gear 31 from the tilt motor 30 to a gear 32 fixed to the swing frame 43. The tilt motor 30 is similarly arranged at a position within the maximum radius of turn of the tilt frame 40, i.e., in a dead space created when the tilt frame 40 turns to tilt.

On an inner surface of the upper wall 210 of the monorail 100, as shown in FIG. 3, there are attached a chain 101 by a chain holder 101a at the transverse center, trolley lines 102 by a trolley line holder 102a on one side in the transverse direction, and an antenna line 103 by an antenna line holder 103a for wireless communication on the other side. The sprocket 16 is held in mesh with the chain 101, the current collectors 61 are held in slide contact with the trolley lines 102, and further the antenna line 103 is positioned to face the antenna 70.

The sensor unit 50 incorporates therein a visible camera, an infrared camera and a microphone, each camera being provided with a zoom lens. A visible image and an infrared image can be switched over on the robot side in response to a switching signal from the ground. The communication device is naturally operated in a multiplex mode because it performs communication of total four channels via the single antenna 70 and the single antenna line 103; i.e., one channel for transmitting a video signal, one channel for transmitting a voice signal, one channel for transmitting data, and one channel for receiving a command signal. Cables, wires and so forth leading out of the sensor unit 50 are connected, as indicated by a on-dot-chain line 203 in FIG. 1, to the control circuit unit 80 on the rear side in such a route as passing through a hollow portion of the tilt shaft 41 and a groove 204 formed in an inner surface of the swing frame 43, extending upwardly through a hollow portion of the swing shaft 5b, and then passing through a hollow portion of the steering shaft 4A of the carriage 2 and a groove 205 formed in a lower surface of the coupling plate 5. Wires leading from the swing motor 20 and the tilt motor 30 are also connected to the control circuit unit 80 in a like manner.

The control circuit unit 80 receives a command from a control console (not shown) installed on the ground and makes control of the travel motor 10, the swing motor 20, the tilt motor 30, the sensor unit 50 and so forth.

Moreover, as shown in FIG. 3, cooling hoses 180 for cooling the robot 200 are disposed in a space below the monorail 100. When the robot is traveled through an atmosphere at a very high temperature, the cooling hoses 180 jet out air, for example, to lower the atmosphere temperature only around the monorail. Specifically, the cooling hoses 180 are provided with nozzles 181, 182 at places properly spaced from each other, and cooling air is dispersedly jetted out of the nozzles 181, 182 toward only the atmosphere through which the robot travels, so that a barrier like an air curtain is formed to enclose the passage space of the robot where the temperature is lower than the ambient atmosphere. The cooling air is not required to be jetted out at all times and may be injected into the hoses of a corresponding system only when the robot travels through an area covered by that system.

Advantages in operation of this embodiment arranged as set forth above will be described below.

First, in the traveling inspection robot system of this embodiment, the monorail 100 is in the form of a channel as will be seen from FIG. 3, and this channel-shaped monorail 100 accommodates therein not only the guide rollers 6a, 6b, 8a, 8b and the side rollers 7a, 7b, 7c, 7d, 9a, 9b, 9c, 9d of the robot 200, but also the sprocket 16, the current collectors 61, 62, the antenna 70, the trolley lines 102, the antenna line 103, and so forth. Accordingly, the provision of those components does not need more space than defined by width x height of the rail cross-section that is essentially required for the monorail itself, and gives rise to no additional increase in the cross-sectional area for passage of the robot. Also, since the travel motor 10 is mounted on the same carriage 1 as the sprocket 16, at least a part of the travel motor 10 can be arranged tolerate inside the monorail, as will be seen from FIG. 1. It is, therefore, possible to reduce the size of the travel unit 201, hence the size of the robot.

Next, since the current collectors 61, 62, the antenna 70 or other control units are mounted on the carriage 2 rather than the carriage 1 provided with the sprocket 16 and the travel motor 10, the space inside the monorail 100 can be effectively utilized and the number of those components which must be mounted below the coupling plate 5 is reduced. This also contributes to a reduction in the robot size.

On the other hand, when the travel motor 10 rotates, the motor's rotation is transmitted to the sprocket 16 held in mesh with the chain 101, whereby the carriages 1, 2 are moved back and forth along the monorail 100. Thus, since the sprocket 16 and the chain 101 give the traction force to the monorail's upper wall 210 inside the monorail 100, the monorail's side walls 212a, 212b require no additional height for installation of the sprocket 16 and the chain 101 and, correspondingly, the size of the monorail 100 can be reduced.

In addition, the carriages 1, 2 are connected with each other via the steering shafts 3A, 4A and the coupling plate 5, and the guide rollers 6a, 6b, 8a, 8b and the side rollers 7a, 7b, 7c, 7d, 9a, 9b, 9c, 9d are arranged on the carriages 1, 2 as explained above. During the travel of the carriages 1, 2, therefore, even at a corner where the monorail 100 is curved horizontally as shown in FIG. 2, the carriages are perfectly guided with no possibility that the attachments other than the guide rollers and the side rollers may contact the monorail 100. Also, since the sprocket 16 is mounted at the middle position between the two pairs of the side rollers 7a, 7b and 7c, 7d, the travel unit can be always driven to stably travel along the center of the monorail 100 even in a horizontally curved region of the monorail 100. Even when the monorail 100 is curved not only horizontally, but also vertically as indicated by 100a, 100b in FIG. 1, the carriages can be perfectly guided because the guide rollers and the side rollers guide. The travel in both the vertical and horizontal directions. Further, since the sprocket 16 is meshed with the chain 101 to produce the traction force, the carriages can be easily and surely driven without causing a slip even when the monorail is curved vertically. Additionally, since the channel-shaped monorail 100 has the groove 213 between both the lower walls, and the robot is of the suspension type that the travel unit 201, the span and tilt mechanism 202, the control circuit unit 80 and the sensor unit 50 are suspended through the lower groove 213 of the monorail 100, the robot can be traveled in a stable manner. As a result, it is possible to reduce the radius of curvature of the monorail 100 and increase the degree of freedom in rail design.

Thus, with a reduction in size of the robot 200 and the monorail 100 and the greater degree of freedom in rail design, the inspection robot system can be easily mounted into a narrow space when it is practically applied to actual facilities such as nuclear power plants, and the applicable range of the inspection robot system can be enlarged.

Since the space below the monorail 100 is not used for guide rollers and so forth, other necessary components such as the cooling hoses 180 for cooling the robot can be disposed in that space.

Since the current collectors 61 and the antenna 70 are arranged intermediate the two pairs of side rollers 9a, 9b and 9c, 9d of the carriage 2 in opposite relation to the trolley lines 102 and the antenna line 103, respectively, the current collectors 61 and the antenna 70 are always positioned just below the trolley lines 102 and the antenna line 103, respectively, even in a horizontally curved region of the monorail, so that stable power feeding and stable communication can be easily realized.

Since the robot 200 is positioned below the monorail 100, the curvature of the upwardly curving monorail 100a can be set to be large, but the curvature of the downwardly curving monorail 100b cannot be set to be large for the necessity of avoiding interference with the robot. In other words, the radius of the upwardly curving monorail 100a is small and the radius of the downwardly curving monorail 100b is large. Therefore, if the side rollers 7a, 7b, 7c, 7d and 9a, 9b, 9c, 9d are all arranged at the same level, there is a fear that the rearmost side rollers 7a, 7b and the front most side rollers 9c, 9d may interfere with the inner lower surfaces of the monorail 100a. In this embodiment, since the side rollers are offset relatively in the vertical direction between the front and rear sides as viewed in the direction of advance, the robot can be guided without causing such interference. It should be noted that the attachments other than the guide rollers and the side rollers are arranged in such a manner as not to interfere with the monorail 100b even when the monorail 100 is downwardly curved like the monorail 100b.

In the case of providing another pair of current collectors 62 in addition to the pair of current collectors 61, the current collectors 62 are preferably provided on the inner side of the carriage 1 or 2 so that their strokes required in the vertical direction become as small as possible. However, the current collectors 62 are provided at a position other than the middle between the two pairs of the side rollers and thus required to have three degrees of freedom in motion, i.e., vertical translation, horizontal translation and vertical rotation. Since the current collectors 61 are provided at the middle position between the two pairs of the side rollers so that the positional relationship with respect to the trolley lines 102 in the horizontal direction is kept constant at all times, it is basically sufficient for them to have two degrees of freedom in motion, i.e., vertical translation and vertical rotation. Also, the current collectors 61 require small strokes of vertical translation and, therefore, can adopt compact translation type current collectors. Meanwhile, taking into account that the current collectors 62 require larger strokes of vertical translate on and also must have freedom in horizontal translation, they are desirably constituted by using arm type current collectors.

The pan and tilt mechanism 202 is arranged such that when the swing motor 20 rotates, torque is transmitted via the gears 21, 22, 29 to tile gear 24 fixed to the coupling plate 5, and the resulting reaction force causes the swing frame 43 to swing with respect to the coupling plate 5. The swing motor 20 is arranged at a position within tile maximum radius of swing of the swing frame 43, i.e., in a dead space. The tilt motor 30 is also arranged in a like manner. Thus, by mounting the swing motor 20 and the tilt motor 30 in dead spaces respectively created when the pan and tilt mechanism 202 swings and tilts, the space essentially required for the pan and tilt mechanism 202 to swing and tilt is not enlarged by the provision of both the motors 20, 30, making it possible to reduce tile size of the pan and tilt mechanism 202, hence the robot size. Although the dead space created when the pan and tilt mechanism 202 turns to tilt is also present below the tilt frame 40, mounting the tilt motor 30 in such a dead space is not desirable because the height of the cross-sectional area for passage of the robot is affected thereby. Meanwhile, the swing motor 20 will not affect the cross-sectional area for passage of the robot because it takes a posture to locate between the sensor unit 50 directing transversely, as shown in not FIG. 2 but FIG. 1, and the control circuit unit 80 during the travel.

Furthermore, the span and tilt mechanism 202 is arranged forwardly of the steering shaft 4A of the carriage 2 as viewed in the direction of advance. By so arranging the span and tilt mechanism 202, there is created a wide space rearwardly of the mechanism 202 in which space the control circuit unit 80 of the robot can be mounted. Also, since the cable 203 leading through the swing shaft 41 of the span and tilt mechanism 202 can be introduced through the steering shaft 4A to the control circuit unit 80 on the rear side, many individual cables wired in the robot can be bundled together into a single cable 203 without twisting it to a large extent and needing any additional space for the cable wiring. Such neat bundling of the individual cables eliminates the need of taking the larger cross-sectional area for passage of the robot with a margin in consideration of a fear that any cable may be caught by something when the robot passes near it. This enables more compact size of the robot.

When the control circuit unit 80 can have smaller size, the travel motor 10 may vertically installed. While the travel motor 10 shown in FIG. 1 is angled to extend obliquely downwardly to avoid interference with the monorail 100, the angle of downward inclination is set as small as possible so that a maximum possible space for installation of the control circuit unit 80 can be obtained. Also, when the control circuit unit 80 can be reduced in size, the pan and tilt mechanism 202 may be mounted intermediate the carriages 1 and 2 to make the robot smaller.

Figure 5:
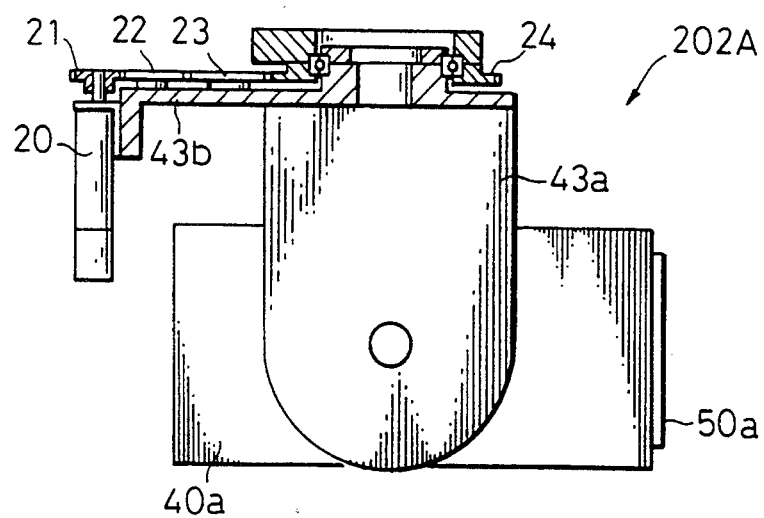
FIG. 5 is a side view of a pan and tilt mechanism in a modification in which a swing motor is arranged on the rear side.

FIG. 5 is a side view of the pan and tilt mechanism a modification in which the swing motor is arranged on the rear side. A pan and tilt mechanism 202A in this modification is arranged such that a part 43b of a swing frame 43a is extended rearwardly and the swing motor 20 is attached to the extended part 43b. This arrangement is effective when a sensor unit 50a and a tilt frame 40a are both small in width and large in length. More specifically, when the sensor unit 50a and the tilt frame 40a are both long, the robot travels with the sensor unit 50a directing forwardly rather than transversely in the above embodiment. Therefore, if the swing motor 20 is arranged in the dead space on the lateral side of the swing frame 43a of the pan and tilt mechanism 202A, the width of the cross-sectional area for passage of the robot would be increased corresponding to the presence of the motor. In such a case, the swing motor 20 is desirably arranged in the dead space rearwardly of the swing frame 43a, as shown in FIG. 5. The pan and tilt mechanism 202 in the above embodiment shown in FIGS. 1 to 4 is suitable for the case of mounting the sensor unit 50 which is large in width and short in length.

Figure 6:
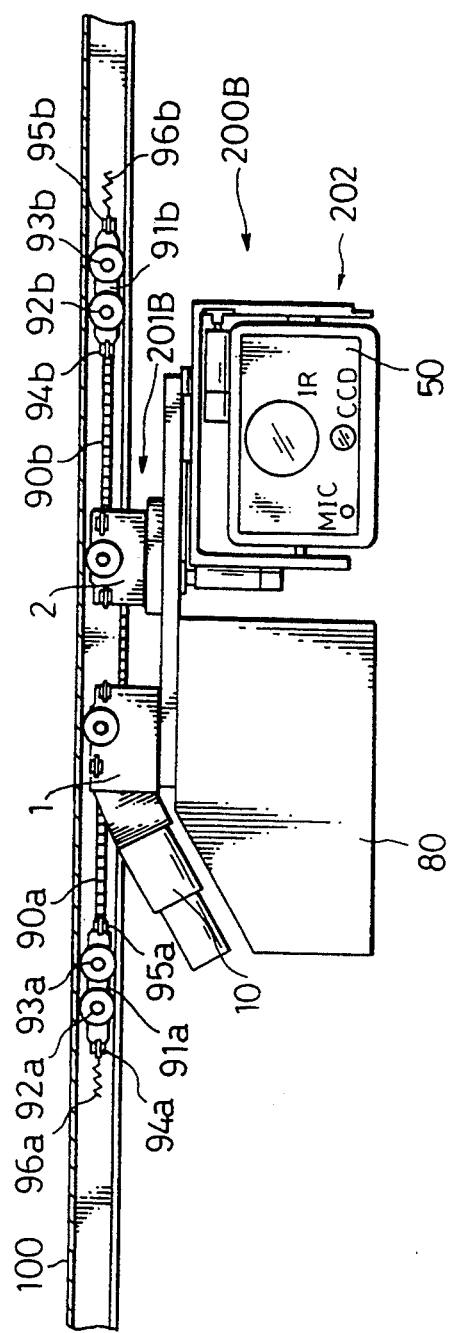
FIG. 6 is a side view of a robot in an embodiment in which collision sensors are attached to the robot.

FIG. 6 shows a side view of a robot in an embodiment in which collision sensors are attached to a travel unit of the robot. Connected to the carriages 1 and 2 of a travel unit 201B are respectively other carriages 91a, 91b through flexible shafts 90a, 90b. The carriage 91a has guide rollers 92a, 93a provided on both sides in the transverse direction (only one side being shown) to be contacted with the lower travel guide surfaces 214a, 214b of the monorail 100 for guiding the travel in the vertical direction, and also side rollers 94a, 95a provided on both sides in the transverse direction forwardly and backwardly of the guide rollers to be contacted with the side travel guide surfaces 211a, 211b of the monorail 100 for guiding the travel in the horizontal direction. The carriage 91b also has guide rollers 92b, 93b and side rollers 94b, 95b arranged in a similar manner. Because these carriages 91a, 91b include neither pan and tilt mechanisms nor control circuit units thereunder, each carriage is not necessarily divided into two parts interconnected by a coupling plate via steering shafts. It is however required that the guide rollers are arranged so as to smoothly function in regions where the monorail is curved vertically and turned to the left or right.

Figure 11:
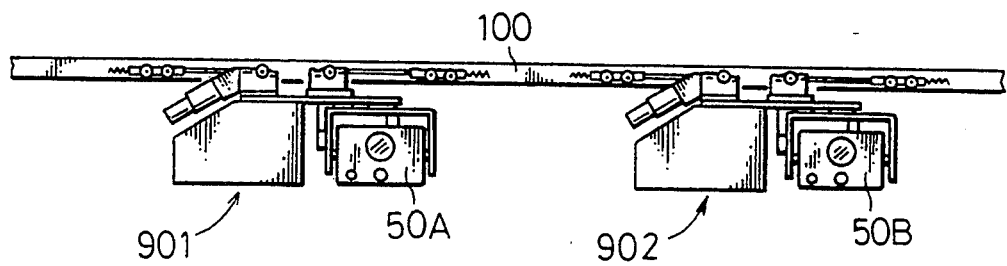
FIG. 11 is a view showing one example of a system for operating two robots simultaneously.

Further, collision sensors 96a, 96b are provided in frontmost and rearmost portions of the carriages 91a, 91b, respectively. The control circuit unit 80 incorporates an interlock actuated in response to a signal from the collision sensors 96a, 96b such that a robot 200B is stopped and no longer traveled in the direction in which the collision has been sensed. Accordingly, just by closing the end of the monorail 100, when the robot travels up to the end of the monorail 100, the collision sensor 96a or 96b of the corresponding side is operated to safely stop the robot. Also, in the case (described later) of traveling two robots along the same monorail as shown in FIG. 11, the collision sensor is operated before the robots strike against each other, thereby preventing collision of the robots in advance.

In this embodiment, the collision sensors 96a, 96b may be given with a function of damping shocks produced upon the collision. The flexible shafts 90a, 90b used in this embodiment are each desirably formed of a spring rod or the like which is hard to buckle in the longitudinal direction but easily susceptible to bending in both the vertical and horizontal directions, and has such an extent of rigidity as allowing the shaft to extend straight when no external forces are imposed. The antenna 70, the current collectors 61 or other control units may be mounted within the carriage 91a or 91b. Moreover, an arrangement may be such that still other several carriages having the same construction as the carriages 91a, 91b are connected in series with an intention of mounting control units or the like on them, to thereby reduce the size of the control circuit unit 80 mounted below the coupling plate 5. When some units are mounted within or below the carriages 91a, 91b, those units are concealed from view and do not affect the cross-sectional area for passage of the robot, because they are positioned inside the monorail 100. Signal cables leading from the collision sensors 96a, 96b and so forth may be spirally wound around the flexible shafts 90a, 90b, but are desirably wired through hollow portions of the flexible shafts.

Figure 7:
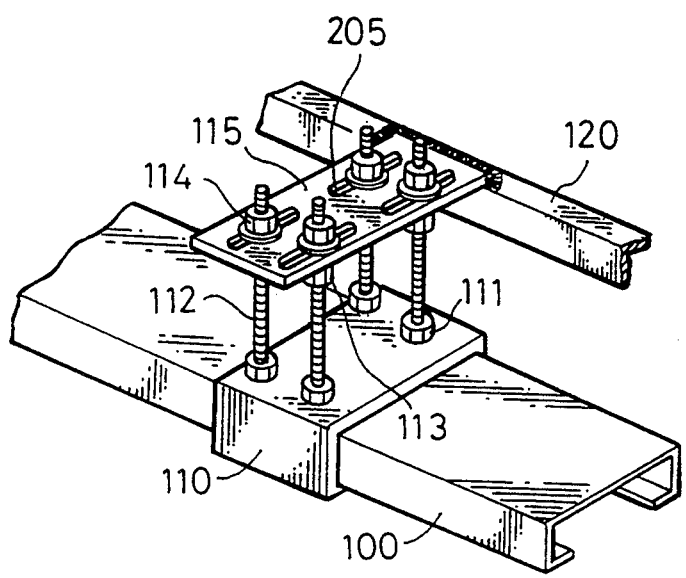
FIG. 7 is a perspective view of a uniaxial-free rail holder.
Figure 8:
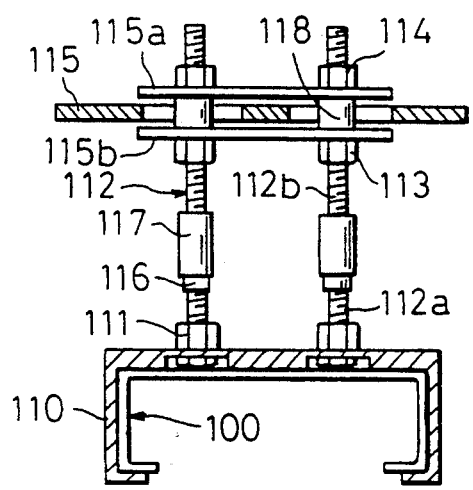
FIG. 8 is a cross-sectional view of a multiaxial-free rail holder.

A description will now be given of embodiments for the structure of mounting the channel-shaped monorail. FIG. 7 shows a uniaxial-free holder for the monorail and FIG. 8 shows a multiaxial-free holder for the monorail. In FIG. 7, a rail holding member 110 is provided so as to cover the monorail 100 and four long bolts 112 are fixed to the holding member 110 by tightly fastening nuts 111. The long bolts 112 are each fixed to a plate 115 by tightly fastening nuts 113 and 114, the plate 115 being attached to a support 120 such as a post or beam by welding or bolting. Elongate holes 205 extending perpendicularly to the monorail are bored in the plate 115 so that a setting error the lengthwise direction of the elongate holes 205 can be absorbed at the time of tightly fastening the nuts 113, 114 for adjustment of the setting position. A vertical setting error can also be absorbed by adjusting the positions at which the long bolts 112 are tightly fastened. Further, a setting error in the longitudinal direction of the monorail can be absorbed by adjustment between the monorail 100 and the holding member 110.

Alternatively, as shown in FIG. 8, the long bolts 112 may be tightly fastened through collars 118 and slide plates 115a, 115b with minute gaps left between the plate 115 and the slide plates 115a, 115b. This arrangement allows the holding member 110 to slide perpendicularly to the monorail in an amount corresponding to the size of elongate holes in the plate 115 even after tightly fastening all the nuts to fix the holding member 110, whereby a deformation of the monorail due to thermal expansion can be absorbed. In addition, the long bolt 112 may be divided into two segments 112a, 112b which are telescopically assembled through a cylinder-like tube 117 and a rod 116. With this arrangement, an axial deformation of the long bolt 112 due to thermal expansion can be absorbed. By arranging the four long bolts 112 at four corners of the rectangular area, rigidity can be sufficiently increased in all directions.

Figure 9:
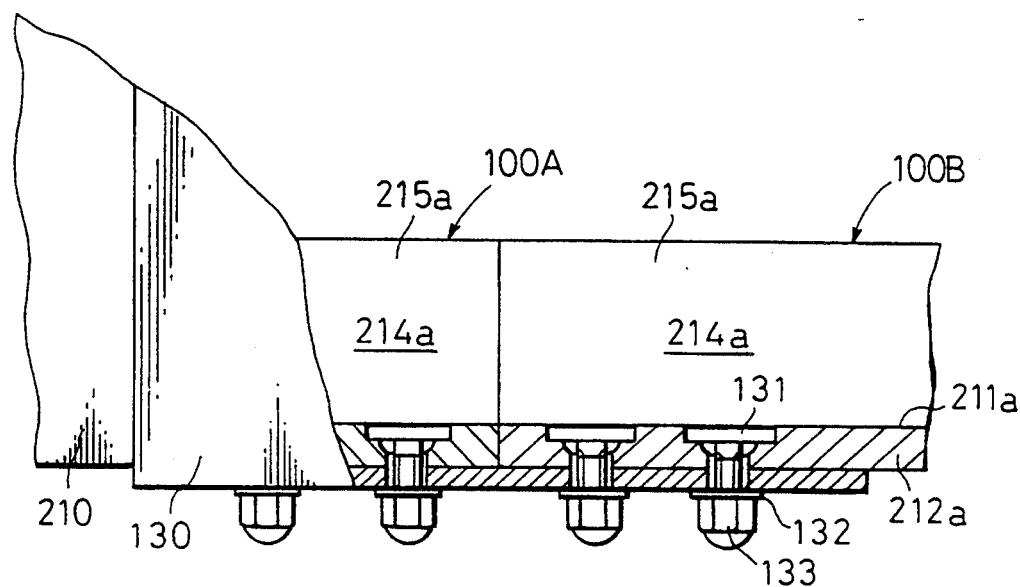
FIG. 9 is a cross-sectional view of principal parts, showing a straight type rail joint.
Figure 10:
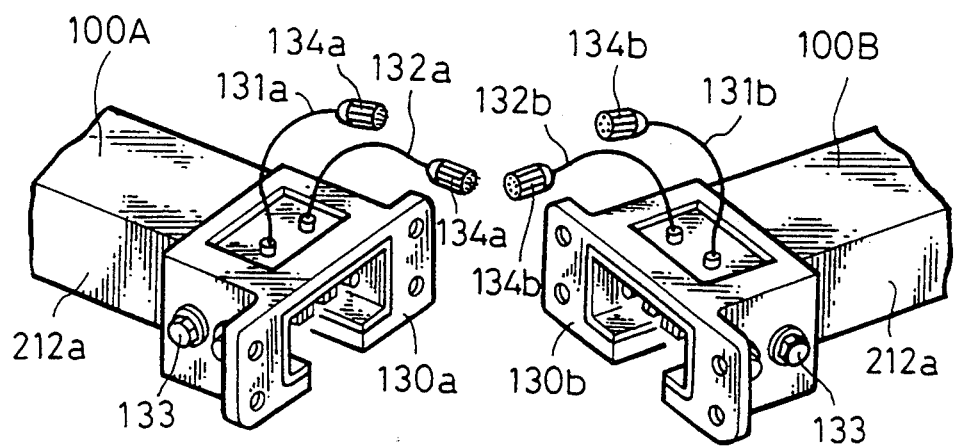
FIG. 10 is a perspective view showing a flange type rail joint.

FIG. 9 shows an embodiment of a straight type rail joint and FIG. 10 shows an embodiment a flange type rail joint. A rail element 100A and a rail element 100B both constituting the monorail 100 are abutted at their end faces with each other, and a joint member 130 is provided to cover the abutted ends of both the elements from the outside. The rail elements 100A, 100B and the joint member 130 are connected together by bolts 131, washers 132 and nuts 133. The bolts 131 are provided to align in the longitudinal direction of the monorail on the side walls 212a, 212b (see FIG. 3) of the rail elements 100A, 100B. If the joint member 130 and the rail elements 100A, 100B are manufactured without any clearances therebetween, bending moments acting on the monorail in the vertical and horizontal directions can be borne by the joint member 130, and only a force acting in the longitudinal direction of the monorail is borne by the bolts 131.

Each of the bolts 131 may have a hexagonal or rectangular head. However, by making the bolt have the same head shape as a spot facing hole formed in inner surfaces of the side walls of the rail elements 100A, 100B, the head of the bolt 131 is just fitted into the spot facing hole so that the monorail's inner surfaces become smooth. In the case of the bolt 131 having a round head, a small hexagonal hole or the like is required to be bored as means for tightly fastening the nut 133.

With the bolts 131 for connection of the joint member 130 fastened through the side walls of the monorail, the travel guide surfaces 214a, 214b of the lower walls 215a, 215b contacting the guide rollers 6a, 6b, 8a, 8b (see FIG. 2), which bear the dead load of the robot in the vertical direction, can be kept smooth without any irregularities, as shown, enabling the guide roller to roll over smoothly. The travel guide surfaces on the side walls are also finished to become smooth after attaching the bolts 131, so that the side rollers 7a, 7b, 7c, 7d, etc. can roll over smoothly.

For the straight type joint shown in FIG. 9, the joint is small in size, but requires laborious work because all the bolts 131 must be tightened or removed whenever the joint is attached or detached. In view of that, by using flange type joints 130a, 130b which are separable from each other as shown in FIG. 10, it becomes possible to easily disassemble the monorail at the joints by loosening bolts or releasing clamp mechanisms instead of bolts. Further, in this embodiment, trolley lines 131a, 131b and communication lines 132a, 132b are led out of the monorail to be interconnected through connectors 134a, 134b. This eliminates the need of wiring the trolley lines and the communication line each time the monorail is disassembled. The chain can be easily set up or dismantled at the site by preparing such a jig as enabling the chain to be connected or disconnected in a simple manner.

Figure 12:
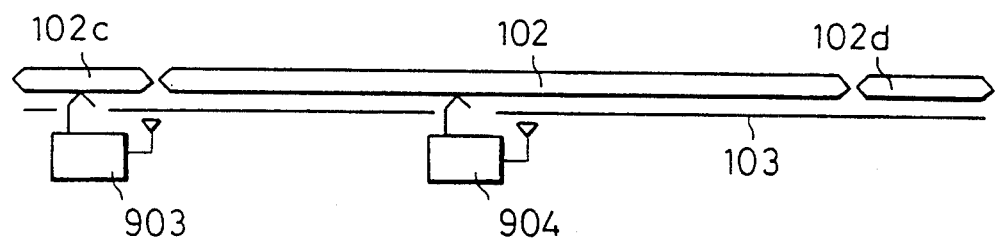
FIG. 12 is a view showing an operating system provided with a shunting trolley rail.
Figure 13:
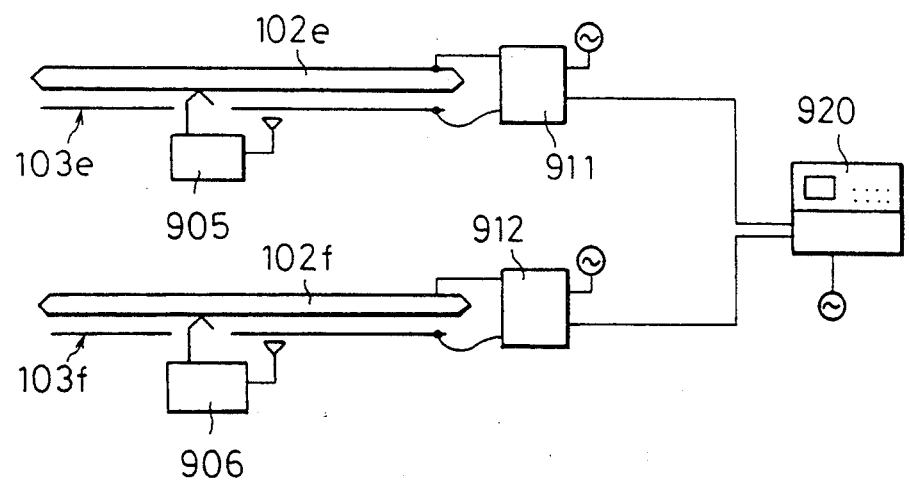
FIG. 13 is a view showing an operating system for a plurality of robots.

FIGS. 11, 12 and 13 are views for explaining operating examples of the traveling inspection robot of the present invention in which; FIG. 11 shows one example of a system for operating two robots simultaneously, FIG. 12 shows an operating system provided with a shunting trolley rail, and FIG. 13 shows an operating system for a plurality of robots.

In FIG. 11, one robot 901 loaded with a sensor unit 50A and the other robot 902 loaded with a sensor unit 50B are traveled along the same monorail 100. In this case, a single control console may be provided on the ground. Control is performed, by way of example, such that one robot 901 loaded with the sensor unit 50A is carrying out the inspection and monitoring work, while the other robot 902 loaded with the sensor unit 50B is moved to another inspection and monitoring point. By so controlling, even if the control console includes a single unit of image processor, FFT analyzer and so forth, it is possible to efficiently and automatically perform the inspection and monitoring work, such as visual inspection, temperature check and abnormal sound check, for many points by using the two inspection robots. In this system, the sensor unit 50A and the sensor unit 50B may accommodate separate sensors from each other, or one robot may be loaded with only an illumination unit instead of the sensor unit. Since communication between the robots 901, 902 and the ground are carried out via the same antenna line for both the robots, it is required to communicate with the two robots using a single communication device by making bands of carrier frequency different from each other or by high-speed polling when the same carrier frequency is used.

In the system of FIG. 12, in addition to the trolley line 102 covering the route usually inspected, the trolley line 102 is extended in both opposite directions corresponding to shunting rails in such a manner as to provide independent trolley lines 102c and 102d. The antenna line 103 for communication may be formed of a single line wired all over the route. It is only required that a robot 903 and a robot 904 are of the same construction and respective robot control circuits are turned on when power is supplied to the trolley line 102 or 102c, 102d.

Usually, the robot 904 is operated by using the trolley line 102. When the camera on the robot 904 is so deteriorated as to present no images, for example, power is supplied to the trolley line 102d and the robot 904 is moved into the shunting rail associated with the trolley line 102d. After cutting off the power supply to the trolley line 102d, power is now supplied to the trolley line 102c and the robot 903 is moved into the monorail associated with the trolley line 102. As a result, the operation can be successively continued by using the robot 903 instead of the robot 904.

The system of FIG. 12 is particularly effective for the case that the inspection robot is applied to a place where persons cannot enter for a long period of time, such as the interior of a reactor container in nuclear power plants. In such an application, the robot 903 serves as a backup robot and the shunting rail is preferably laid within a radiation protective wall or the like, in particular, inside the reactor container.

In the system of FIG. 13, a robot 905 is traveled along an inspection route for which power feeding and communication are performed through a trolley line 102e and an antenna line 103e, while a robot 906 is traveled along another inspection route for which power feeding and communication are performed through a trolley line 102f and an antenna line 103f. By so arranging, a plurality of robots can be operated and automatically controlled along a plurality of inspection routes by using a single control console 920. It is only required in this case that relays 911, 912 are provided in association with respective routes and their switching operation can be controlled by the control console 920. As a modification, the monorail associated with the trolley line 102e may connected to the monorail associated with the trolley line 102f so that the single robot 905 may cover the extremely long inspection route. Although the prolonged inspection route may cause a voltage drop in the feed wire or a reduction in the communication level, there can be provided an inspection robot system which has sufficiently high reliability even for such an extremely long inspection route, by extending the inspection route in accordance with the arrangement of this system including the relays 911, 912.

According to the present invention, as described above, the degree of freedom in rail design can be increased, the inspection robot and the monorail can be both made small in size, and therefore the applicable range of the traveling inspection robot can be enlarged.

Also, according to the present invention, since the radius of swing of the pan and tilt mechanism can be reduced, it is possible to make the inspection robot smaller in size and further increase the applicable range of the traveling inspection robot can be enlarged.

In addition, the present invention can provide many other advantages as set forth in the above description of the embodiments.

What is claimed is:

1. A traveling inspection robot system comprising a monorail and an inspection robot traveling along said monorail, said inspection robot comprising a travel unit and a sensor unit mounted to said travel unit, said system being operated by a control console installed on the ground, wherein:

(a) said monorail is a channel-shaped rail comprising a closed upper wall, a pair of side walls suspending from both transverse ends of said upper wall in opposite relation to form first travel guide surfaces, and a pair of lower walls extending inwardly from lower ends of said side walls to form second travel guide surfaces and spaced from each other in the transverse direction by a groove; and (b) said travel unit comprises first and second carriages, each being provided with one pair of guide rollers contacting said second travel guide surfaces inside said monorail to guide the travel in the vertical direction and with two pairs of side rollers arranged on the front and rear sides of said pair of guide rollers as viewed in the direction of advance, respectively, and contacting said first travel guide surfaces inside said monorail to guide the travel in the horizontal direction, coupling means interconnecting said first and second carriages for independent rotation thereof through parallel steering shafts attached to said first and second carriages, respectively, and travel driving means provided on at least one of said first and second carriages for giving a traction force to a transversely central portion of said upper wall inside said monorail.

2. A traveling inspection robot system according to claim 1, wherein said side walls of said monorail have an external height almost equal to the sum of the diameter of said guide rollers, the thickness of said upper wall, and the thickness of said lower walls.

3. A traveling inspection robot system according to claim 1, wherein said travel driving means comprises a travel sprocket arranged in a transversely central portion of one of said first and second carriages at a middle position between said two pairs of side rollers, and a chain arranged in the transversely central portion of said upper wall and held in mesh with said travel sprocket inside said monorail.

4. A traveling inspection robot system according to claim 3, wherein said travel unit further comprises a motor mounted on the same carriage as said sprocket for driving said sprocket.

5. A traveling inspection robot system according to claim 1, wherein said travel unit further comprises a current collecting device, an antenna for wireless communication and/or other control units all mounted on the other of said first and second carriages inside said monorail.

6. A traveling inspection robot system according to claim 5, wherein said travel unit further comprises a trolley line wired along one side of said upper wall in the transverse direction inside said monorail and an antenna line for wireless communication wired along the other side thereof, said current collecting device and said antenna for wireless communication being arranged at a middle position between said two pairs of side rollers of the other said carriage in opposite relation to said trolley line and said antenna line, respectively.

7. A traveling inspection robot system according to claim 1, wherein said two pairs of side rollers are offset relatively in the vertical direction.

8. A traveling inspection robot system according to claim 1, further comprising a gate-shaped pan and tilt mechanism attached to one of said first and second carriages to be swingable by a swing motor, wherein said sensor unit is attached to said gate-shaped pan and tilt mechanism to be tiltable by a tilt motor, said swing motor and said tilt motor being arranged in respective dead spaces created when said gate-shaped pan and tilt mechanism swings and tilts.

9. A traveling inspection robot system according to claim 8, wherein said pan and tilt mechanism is arranged forwardly of the steering shaft of said one carriage as viewed in the direction of advance.

10. A traveling inspection robot system according to claim 1, wherein said travel unit further comprises third and fourth carriages respectively attached to said first and second carriages through elastic support means.

11. A traveling inspection robot system according to claim 10, wherein said third and fourth carriages each have a collision sensor and a collision damper attached to each of foremost and rearmost portions as viewed in the direction of advance.

12. A traveling inspection robot system according to claim 1, further comprising holder means for holding said monorail to a stationary portion, wherein said holder means comprises a holder body covering said monorail from the outside, at least three long bolts attached to an upper portion of said holder body, and a support for fixing said at least three long bolts in such a manner as able to absorb setting errors of said monorail in both the longitudinal and perpendicular directions of said monorail and thermal expansion of said monorail.

13. A traveling inspection robot system according to claim 1, wherein said monorail comprises a plurality of rail elements joined to each other to make up said monorail, and joint means for covering joined portions of adjacent rail elements from the outside, said joint means being fixed in place by tightly fastening bolts through the side walls of the adjacent rail elements such that inner surfaces of said rail elements become smooth.

14. A traveling inspection robot system according to claim 13, wherein said travel unit further comprises a trolley line and an antenna line for wireless communication both being wired along said upper wall inside each of said rail elements, said trolley lines and/or said antennas for wireless communication in the adjacent rail elements being led out of said monorail through said joint means and connected to each other through connectors.

15. A traveling inspection robot system according to claim 1, wherein said sensor unit is attached to a lower portion of said travel unit through a pan and tilt mechanism.

16. A traveling inspection robot system comprising a monorail and an inspection robot traveling along said monorail, said inspection robot comprising a travel unit and a sensor unit mounted to said travel unit, said system being operated by a control console installed on the ground, wherein:

(a) said monorail is a channel-shaped rail comprising a closed upper wall, a pair of side walls suspending from both transverse ends of said upper wall in opposite relation to form first travel guide surfaces, and a pair of lower walls extending inwardly from lower ends of said side walls to form second travel guide surfaces and spaced from each other in the transverse direction by a groove;

(b) said travel unit comprises first and second carriages, each being provided with one pair of guide rollers contacting said second travel guide surfaces inside said monorail to guide the travel in the vertical direction and with two pairs of side rollers arranged on the front and rear sides of said pair of guide rollers as viewed in the direction of advance, respectively, and contacting said first travel guide surfaces inside said monorail to guide the travel in the horizontal direction, coupling means interconnecting said first and second carriages for independent rotation thereof through parallel steering shafts attached to said first and second carriages, respectively, and travel driving means provided on at least one of said first and second carriages for giving a traction force to a transversely central portion of said upper wall inside said monorail;

(c) said side walls of said monorail have a height almost equal to the sum of the diameter of said guide rollers, the thickness of said upper wall, and the thickness of said lower walls; and (d) said travel driving means comprises a travel sprocket arranged in a transversely central portion of one of said first and second carriages at a middle position between said two pairs of side rollers, and a chain arranged in the transversely central portion of said upper wall and held in mesh with said travel sprocket inside said monorail.

17. An inspection robot traveling along a channel-shaped rail comprising a closed upper wall, a pair of side walls suspending from both transverse ends of said upper wall in opposite relation to form first travel guide surfaces, and a pair of lower walls extending inwardly from lower ends of said side walls to form second travel guide surfaces and spaced from each other in the transverse direction by a groove, said inspection robot comprising;

first and second carriages, each being provided with one pair of guide rollers contacting said second travel guide surfaces inside said monorail to guide the travel in the vertical direction and with two pairs of side rollers arranged on the front and rear sides of said pair of guide rollers as viewed in the direction of advance, respectively, and contacting said first travel guide surfaces inside said monorail to guide the travel in the horizontal direction, coupling means interconnecting said first and second carriages for independent rotation thereof through parallel steering shafts attached to said first and second carriages, respectively, and travel driving means provided on at least one of said first and second carriages for giving a traction force to a transversely central portion of said upper wall inside said monorail.

18. An inspection robot according to claim 17, wherein said travel driving means comprises a travel sprocket arranged in a transversely central portion of one of said first and second carriages at a middle position between said two pairs of side rollers, and a chain arranged in the transversely central portion of said upper wall and held in mesh with said travel sprocket inside said monorail.

19. An inspection robot according to claim 18, further comprising a motor mounted on the same carriage as said sprocket for driving said sprocket.

20. An inspection robot according to claim 17, further comprising a current collecting device, an antenna for wireless communication and/or other control units all mounted on the other of said first and second carriages inside said monorail.

21. An inspection robot according to claim 20, further comprising a trolley line wired along one side of said upper wall in the transverse direction inside said monorail and an antenna line for wireless communication wired along the other side thereof, said current collecting device and said antenna for wireless communication being arranged at a middle position between said two pairs of side rollers of the other said carriage in opposite relation to said trolley line and said antenna line, respectively.

22. An inspection robot according to claim 17, wherein said two pairs of side rollers are offset relatively in the vertical direction.

* * * * *